(12) United States Patent
Nakami (10) Patent No.: US 7,555,140 B2
(45) Date of Patent: Jun. 30, 2009

(54) IMAGE PROCESSING USING OBJECT INFORMATION

(75) Inventor: Yoshihiro Nakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1251 days.

(21) Appl. No.: 10/486,744

(22) PCT Filed: Sep. 11, 2002

(86) PCT No.: PCT/JP02/09308

§ 371 (c)(1),
(2), (4) Date: Feb. 13, 2004

(87) PCT Pub. No.: WO03/024101

PCT Pub. Date: Mar. 20, 2003

(65) Prior Publication Data

US 2004/0234153 A1    Nov. 25, 2004

(30) Foreign Application Priority Data

Sep. 11, 2001  (JP) .............................. 2001-275153
Aug. 29, 2002  (JP) .............................. 2002-250045

(51) Int. Cl.
*G06K 9/36* (2006.01)
(52) U.S. Cl. ..................... 382/103; 382/254; 382/291
(58) Field of Classification Search ............... 382/103, 382/254, 255, 276, 282, 288, 291
See application file for complete search history.

(56) References Cited

U.S. PATENT DOCUMENTS

| | | | |
|---|---|---|---|
| 5,270,805 A | 12/1993 | Abe et al. | ................... 358/500 |
| 5,706,049 A | 1/1998 | Moghadam et al. | ......... 348/333 |
| 7,218,759 B1* | 5/2007 | Ho et al. | ..................... 382/118 |
| 2002/0025079 A1* | 2/2002 | Kuwata et al. | .............. 382/254 |

(Continued)

FOREIGN PATENT DOCUMENTS

JP    11-136568 A    5/1999

(Continued)

OTHER PUBLICATIONS

Abstract of Japanese Patent Publication No. 11-136568, Pub. Date: May 21, 1999, Patent Abstracts of Japan.

(Continued)

*Primary Examiner*—Andrew W Johns
(74) *Attorney, Agent, or Firm*—Martine Penilla & Gencarella, LLP (57) ABSTRACT

A CPU 300 divides an image into plural regions and for each of the regions, generates a histogram and calculates an average brightness Y ave. The CPU 300 determines a focus location on the image by using focus location information, sets a region at the determined location as an emphasis region, and sets the average brightness Y ave of the emphasis region as a brightness criterion Y std. The CPU 300 uses the brightness criterion Y std to determine non-usable regions. By using the regions not excluded as non-usable regions, the CPU 300 calculates an image quality adjustment average brightness Y' ave, i.e. the average brightness of the entire image, with a weighting W in accordance with the locations of the regions reflected thereto, and executes a bright value correction by using the calculated image quality adjustment average brightness Y' ave.

8 Claims, 8 Drawing Sheets

U.S. PATENT DOCUMENTS

2002/0057847 A1 * 5/2002 Hayashi et al. ............. 382/282

FOREIGN PATENT DOCUMENTS

| JP | 11-331596 A | 11/1999 |
| --- | --- | --- |
| JP | 2000-295570 A | 10/2000 |
| JP | 2001-036763 A | 2/2001 |
| JP | 2001-128044 A | 5/2001 |
| JP | 2001-147481 A | 5/2001 |
| JP | 2001-223941 A | 8/2001 |

OTHER PUBLICATIONS

Abstract of Japanese Patent Publication No. 11-331596, Pub. Date: Nov. 30, 1999, Patent Abstracts of Japan.

Abstract of Japanese Patent Publication No. 2001-036763 Pub. Date: Feb. 9, 2001, Patent Abstracts of Japan.

Abstract of Japanese Patent Publication No. 2001-147481, Pub. Date: May 29, 2001, Patent Abstracts of Japan.

Abstract of Japanese Patent Publication No. 2001-223941, Pub. Date: Aug. 17, 2001, Patent Abstracts of Japan.

Abstract of Japanese Patent Publication No. 2001-169174, Pub. Date: Jun. 22, 2001, Patent Abstracts of Japan.

Abstract of Japanese Patent Publication 2000-295570, Pub. Date: Oct. 20, 2000, Patent Abstracts of Japan.

Abstract of Japanese Patent Publication 2001-128044, Pub. Date: May 11, 2001, Patent Abstracts of Japan.

* cited by examiner

IMAGE PROCESSING USING OBJECT INFORMATION

TECHNICAL FIELD

The present invention relates to an image processing technique that uses major object information of images.

BACKGROUND ART

In order to improve the accuracy of image processing (image correction) of image data that was shot by a shooting device, a technique is known to divide the image into plural regions and to perform an image correction with a focus on an emphasis region of the image. Since the emphasis region of an image is generally considered as being equivalent to a region that contains the major object of the image, the central region of the image is typically used as the emphasis region.

However, the major object is not always located in the central region of an image. For example, in the case where an image is shot with a row of mountains in its background, the major object of the image may possibly be located in its side region. Accordingly, in the case where the major object is located in the side region of an image, conventional techniques that identify the central region of an image as an emphasis region had difficulties in achieving an image correction of the major object with high accuracy and therefore could not obtain an intended output result.

SUMMARY OF THE INVENTION

The purpose of the present invention is to solve the problems noted above, and to improve the accuracy of image processing by setting and using an appropriate emphasis region for every image data.

In order to achieve the purpose noted above, a first aspect of the present invention provides an image processing device that executes image processing by using image data and object information, which is associated with the image data and indicates a location of a major object on an image that is based on the image data. The image processing device of the first aspect of the present invention includes: an emphasis region determination module that determines an emphasis region, which is to become a basis of image processing, by using the object information; and an image processing module that analyzes the image data on the basis of the emphasis region and executes image processing of the image data based on the result of analysis.

The image processing device of the first aspect of the present invention determines an emphasis region of image processing by using the object information; analyzes the image data on the basis of the determined emphasis region; and executes image processing of the image data based on the result of analysis. With this structure, an appropriate emphasis region can be set and used for every image data, and thus the accuracy of image processing can be improved.

The image processing device of the first aspect of the present invention may comprise a division module that divides an image, which is based on the image data, into plural regions, and the emphasis region may be determined from among the plural regions. By dividing an image into plural regions, it is possible to determine an emphasis region with high accuracy, and it is also possible to improve the accuracy of image processing based on the emphasis region.

In the image processing generation device of the first aspect of the present invention, the image processing module may comprise a region image characteristic value obtaining module that obtains region image characteristic values for each of the emphasis region and the plural regions other than the emphasis region based on the result of the analysis, and may execute image processing of the image data based on the region image characteristic value in the emphasis region and the region image characteristic values in the plural regions close to the emphasis region. With this structure, image processing can be performed on the basis of the result of analysis and with a focus on the emphasis region, so that the image processing can be executed in a suitable way.

In the image processing device of the first aspect of the present invention, the image processing module may comprise: a region image characteristic value obtaining module that obtains a region image characteristic value for each of the emphasis region and the plural regions other than the emphasis region based on the result of the analysis; and an image characteristic value generation module that generates an image characteristic value of the entire image by making the weighting of the region image characteristic values in the plural regions larger as the regions become closer to the emphasis region, and the image processing module may execute image processing of the image data based on the generated image characteristic value. With this structure, image processing can be performed more on the basis of the result of analysis and more with a focus on the emphasis region, so that the image processing can be executed with more accuracy.

In the image processing device of the first aspect of the present invention, the image characteristic value generation module may comprise a region classification module that classifies the plural general regions other than the emphasis region into usable regions and non-usable regions by using the region image characteristic value of the emphasis region, and may generate the image characteristic value by using the region image characteristic value of the emphasis region and the region image characteristic values of the usable regions. With this structure, the image characteristic value that is used for image processing can be obtained with a focus on the emphasis region, so that influences from noises or the like can be reduced and the image processing can be executed in a suitable way.

In the image processing device of the first aspect of the present invention, the region classification module may also classify the usable regions and the non-usable regions based on the absolute differences between the region image characteristic value of the emphasis region and the region image characteristic values of the general regions.

In the image processing device of the first aspect of the present invention, the classification of regions based on the absolute differences between the region image characteristic value of the emphasis region and the region image characteristic values of the general regions may be executed by classifying a general region as a non-usable region in case where the absolute difference between the region image characteristic value of the emphasis region and the region image characteristic value of the general region is equal to or more than a predetermined value, and as a usable region in case where the absolute difference is less than the predetermined value. In general, as the absolute difference between the region image characteristic values of a general region and the emphasis region becomes larger, the general region tends to be more remotely related with the emphasis region, i.e., tends to be more away from the center of the image. For this reason, by classifying such regions as the non-usable regions, it is possible to obtain a more appropriate image characteristic value as well as to improve the accuracy of image processing.

In the image processing device of the first aspect of the present invention, the predetermined value may vary according to the distances between the emphasis region and each of the general regions. This is typically because the significance of each region in the image is often proportional to the distance from the emphasis region.

In the image processing device of the first aspect of the present invention, the object information may be a piece of information that indicates a location to where a focus is on, in an image that is based on the image data. Since a photographer (an image file generator) typically focuses on a location to where he (or she) is most interested in, the emphasis region on the image can be easily determined by using the focused location.

In the image processing device of the first aspect of the present invention, the image processing may be a type of processing that reduces the absolute difference between the obtained image characteristic value and a predefined image processing reference value.

In the image processing device of the first aspect of the present invention, the image file may further include image processing control information that contains image processing conditions in the image processing device and scene specifying information for reflecting a shot scene onto image processing, and the image processing may be executed with the scene specifying information reflected thereto, so as to reduce the absolute difference between the generated image characteristic value and the image processing reference value. With this structure, the accuracy of image processing that is responsive to the shot scene can be improved by performing the image processing with the focus location information reflected thereto and with the basis on the shot scene specifying information.

A second aspect of the present invention provides a computer readable medium that stores an image processing program therein and executes image processing by using image data and object information, which is associated with the image data and indicates a location of a major object on an image that is based on the image data. The computer readable medium according to the second aspect of the present invention includes: a program instruction that determines an emphasis region, which is to become a basis of an image analysis, by using the object information; and a program instruction that analyzes the image data on the basis of the emphasis region and executes image processing of the image data based on the result of analysis.

With the computer readable medium of the second aspect of the present invention, it is possible to attain the same functions and effects as the image processing device of the first aspect of the present invention. The computer readable medium of the second aspect of the present invention may also be implemented in the same various aspects as those of the image processing device of the first aspect of the present invention.

A third aspect of the present invention provides a computer readable medium that stores an image processing program and executes image processing by using image data and object information, which is associated with the image data and indicates a location of a major object on an image that is based on the image data. The computer readable medium of the third aspect of the present invention includes: a program instruction that divides the image, which is based on the image data, into plural regions; a program instruction that determines an emphasis region, which is to become a basis of image analysis, from among the plural regions based on the object information; a program instruction that obtains region image characteristic values of each of the plural regions based on the result of the analysis; a program instruction that classifies the plural regions other than the emphasis region into usable regions and non-usable regions by using the region image characteristic value of the emphasis region; a program instruction that obtains an image characteristic value by using the region image characteristic value of the emphasis region and the region image characteristic values of the usable regions; and a program instruction that executes image processing of the image data by using the image characteristic value.

With the computer readable medium of the third aspect of the present invention, it is possible to attain the same functions and effects as the image processing device of the first aspect of the present invention. The computer readable medium of the third aspect of the present invention may also be implemented in the same various aspects as those of the image processing device of the first aspect of the present invention.

A fourth aspect of the present invention provides a shooting device that generates image data and image processing control information, which is associated with the image data and specifies image processing conditions of the image data in an image processing device. The shooting device of the fourth aspect of the present invention includes: an image data generation module that generates the image data; an object information generation module that generates the object information, which indicates a major object on an image that is based on the image data; and an image processing control information generation module that generates the image processing control information including the generated object information.

With the image file generation device of the fourth aspect of the present invention, an image file that includes image processing control information can be generated, where the image processing control information has object information to indicate a major object on an image that is based on image data.

The shooting device of the fourth aspect of the present invention may further comprise a focus location detecting module that detects a focus location to which a focus is on, on an image that is based on the image data, and the generation of major object identifying information may generate the major object identifying information based on the detected focus location. With this structure, it is possible to generate major object information based on the detected focus location.

The shooting device of the fourth aspect of the present invention may further comprise a major object specification module that specifies the major object in the shot image, and the generation of major object identifying information may generate the major object identifying information based on the specifying information of the major object. With this structure, it is possible to specify a major object on an image by the major object specification module.

The shooting device of the fourth aspect of the present invention may further comprise an image file generation module that generates an image file, which includes the generated image data and the image processing control information. With this structure, it is possible to deal with both the image data and the image processing control information in one image file. The shooting device of the fourth aspect of the present invention may further comprise a shot scene setting module for setting a shot scene, and the image processing control information may include scene specifying information for reflecting the set shot scene onto image processing in an image processing device. With this structure, the shooting device and the image processing device can share the shot scene information that was set in the shooting device, so that the image processing device can achieve image processing with the shot scene taken into consideration.

DETAILED DESCRIPTION OF THE INVENTION

An image processing device and a shooting device of the present invention will be described below based on embodiments in the following order, with reference to the drawings:
A. Configuration of Image Processing System Including Image Processing Device and Shooting Device:
B. Configuration of Each Device Constituting the Image Processing System;
C. Image File Generation Processing;
D. Image Processing; and
D. Other Embodiments.

A. Configuration of Image Processing System Including Image Processing Device

Figure 1:
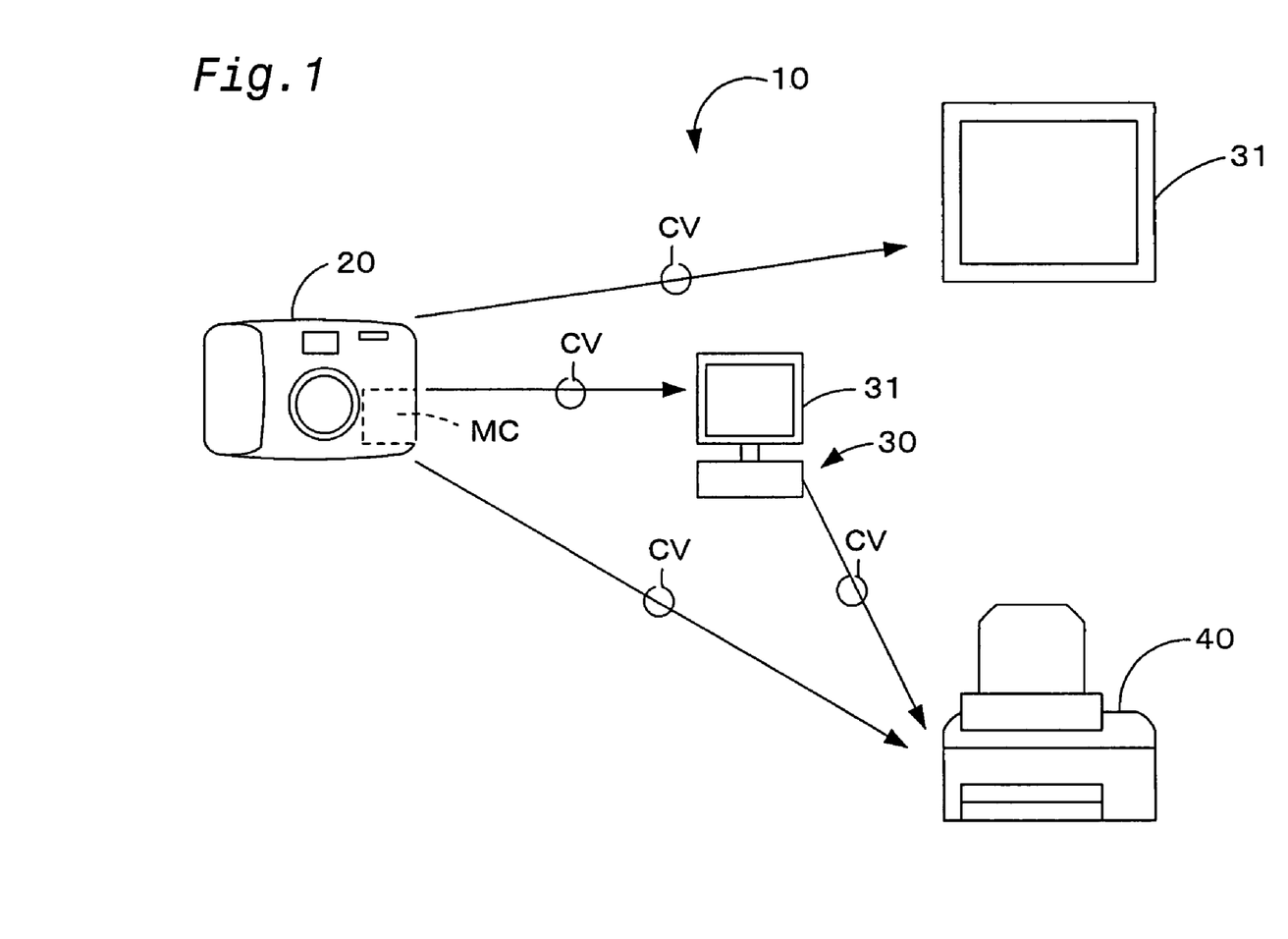
FIG. 1 is a schematic that shows an example of an image processing system including an image processing device and a shooting device of the present embodiment.

The configuration of an image processing system including an image processing device and a shooting device of the present embodiment will be described below with reference to FIG. 1. FIG. 1 is a schematic that shows an example of an image processing system including an image processing device and a shooting device of the present embodiment.

[Note: the numbers in this paragraph do not match the numbers in FIG. 1] An image processing system 10 comprises: a digital still camera 20 as a shooting device that generates an image file including image data and image processing control information, which specifies image processing conditions in an image processing device; a printer 30 as an image processing device that executes image processing as described later by using the image file that was generated in the digital still camera 20; and a personal computer PC. The image file that was generated in the digital camera 20 is supplied to the printer 30 or the personal computer PC via a connecting cable CV or a memory card MC.

B. Configuration of Each Device Constituting Image Processing System

Figure 2:
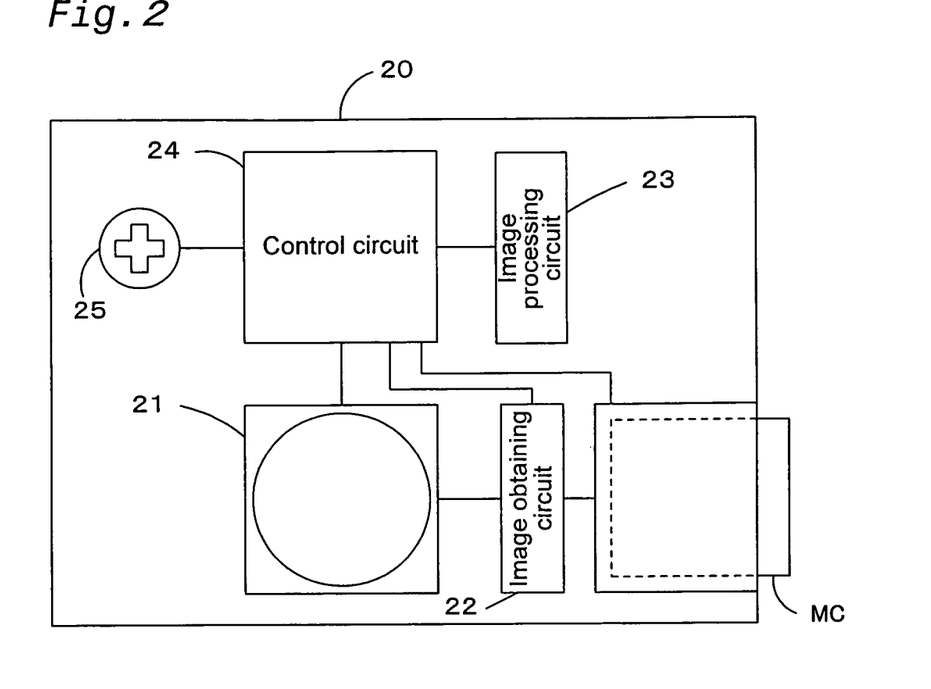
FIG. 2 is a block diagram that schematically shows the general configuration of a digital still camera 20 of the present embodiment.

The digital still camera 20 is a camera that converts optical information into analog electric signals with a CCD or a multiplier phototube and digitalizes the obtained analog electric signals with an A/D converter, so as to generate digital image data. The general configuration of the digital still camera 20 will now be described with reference to FIG. 2. FIG. 2 is a block diagram that schematically shows the general configuration of the digital still camera 20 of the present embodiment. The digital still camera 20 comprises: an optical circuit 21 for collecting optical information; an image obtaining circuit 22 for obtaining an image by controlling a digital device; an image processing circuit 23 for processing the obtained digital image; and a control circuit 24 that controls each circuit. The digital still camera 20 also comprises a select and decide button 25 for selecting and setting image processing control information CI. The generated digital image data is typically stored in a memory card MC as a storage device. Although JPEG format is generally used to store the image data in the digital still camera 20, other storage formats may also be used such as TIFF format, GIF format, BMP format, and RAW data format. As for the image data, images other than a static image may also be used, such as a dynamic image that is recordable by a digital video camera (DVC).

The image file that was generated in the digital still camera 20 typically has a file structure that conforms to the image file format standard (Exif) for digital still cameras. Specifications for Exif files are laid down by the Japan Electronics and Information Technology Industries Association (JEITA). The image file that was generated in the digital still camera 20 of the present embodiment contains image processing control information CI that specifies image processing conditions in an image processing device, e.g. focus location information.

Figure 3:
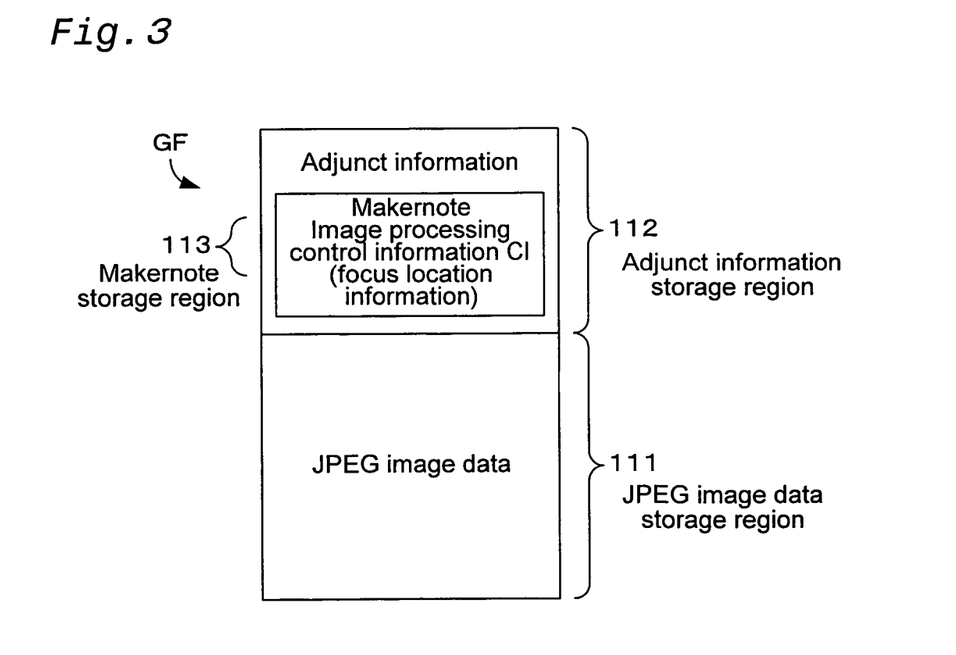
FIG. 3 is a schematic that conceptually shows an example of the internal configuration of an image file that is generated in conformity with the Exif file format in the present embodiment.

The general configuration of an image file that is used in the present embodiment will now be described with reference to FIG. 3. It should be noted that each of the terms such as file structure, data structure, and storage region used herein in the present embodiment represents a file or image data for which the file, the data, or the like is in a state being stored in a storage device. FIG. 3 is a schematic that conceptually shows an example of the internal configuration of an image file that is generated in conformity with Exif file format in the present embodiment.

As shown in FIG. 3, an image file GF that conforms to Exif file format comprises: a JPEG image data storage region 111 that stores image data in JPEG format; and an adjunct information storage region 112 that stores various information regarding the stored JPEG image data. In the adjunct information storage region 112, on-shooting information regarding shooting conditions of the JPEG image, such as time and date of shooting, exposure, shutter speed, and so forth, and thumbnail image data of the JPEG image that is stored in the JPEG image data storage region 111 are stored in TIFF format. The adjunct information storage region 112 further comprises a Makernote data storage region 113 being an undefined region open to DSC makers, and in the present embodiment, the Makernote data storage region 113 is stored with image processing control information CI that specifies image processing conditions in an image processing device, e.g. focus location information. In other words, an image file GF that is generated in the present embodiment differs from a typical image file in Exif format in that the image file GF comprises image processing control information CI in its Makernote data storage region 113. As is well-known to persons skilled in the art, files in Exif format use tags to specify each data item. As for the data that is stored in the Makernote data storage region 113, a Makernote is assigned as a tag name for each data item and is referred to as a Makernote tag.

It should be noted that the image file generating device of the present embodiment not only uses an image file GF that conforms to Exif file format, but may also use other image files that are generated by input devices such as a digital video camera or a scanner. In the case where a digital video camera is used for the generation of an image file, either an image file that stores static image data and image processing control information, or a dynamic image file that contains dynamic image data in, e.g. MPEG format, and image processing control information is generated. In the case where the dynamic image file is used, an image processing control is executed for all or a part of the frame of the dynamic image according to the image processing control information.

Figure 4:
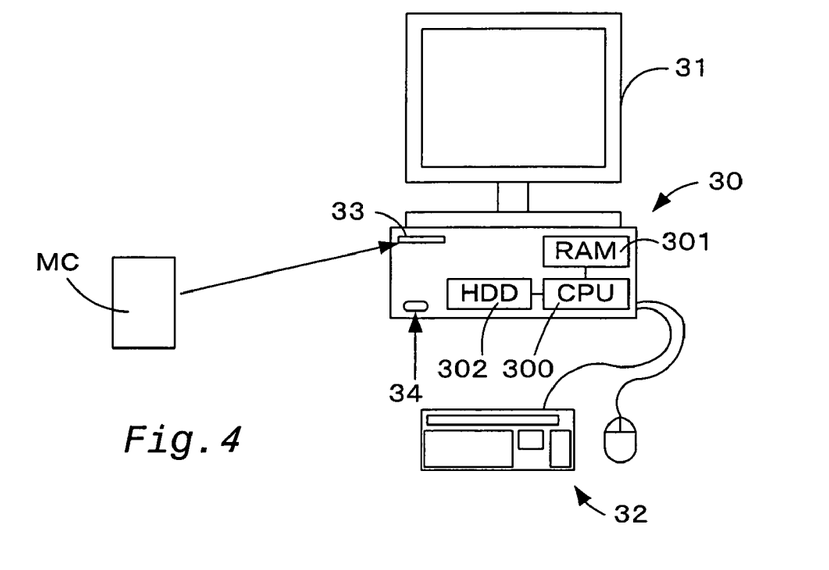
FIG. 4 is a block diagram that schematically shows the general configuration of a personal computer 30 of the present embodiment.

The general configuration of the personal computer 30 will now be described with reference to FIG. 4. FIG. 4 is a block diagram that schematically shows the general configuration of the personal computer 30 of the present embodiment. The personal computer 30 is a general use computer, and includes: a CPU 300 that executes an image processing program of the present invention; a RAM 301 that temporally stores the result of processing in the CPU 300, image data, etc.; a HDD 302 that stores the image processing program, the image processed image data, etc.; a display device 31 for displaying the result of processing in the CPU 300, the image data, etc.; an input device 32 for inputting commands or the like for the CPU 300; and so on forth. The personal computer PC comprises: a card slot 33 for attaching a memory card MC; and an input/output terminal 34 for connecting a connecting cable CV from the digital still camera 20 or the like.

Figure 5:
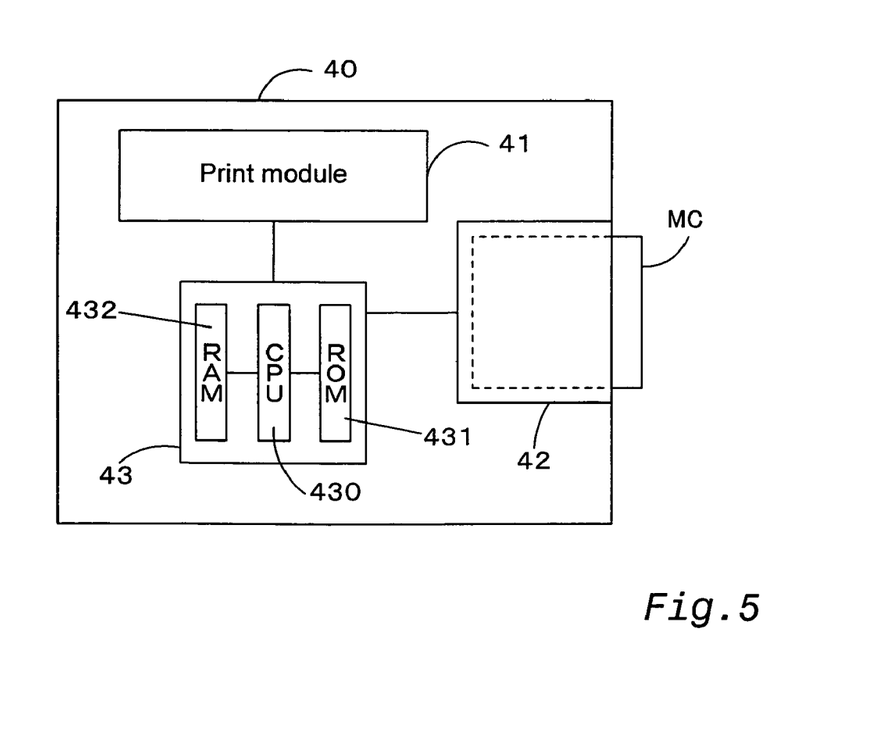
FIG. 5 is a block diagram that schematically shows the general configuration of a color printer 40 of the present embodiment.

The general configuration of a color printer 40 now will be described with reference to FIG. 5. FIG. 5 is a block diagram that schematically shows the general configuration of a color printer 40 of the present embodiment. The color printer 40 is, for example, an inkjet printer that forms an image by injecting four colors of inks, e.g. Cyan (C), Magenta (M), Yellow (Y), and Black (K), onto a printing medium to form a dot pattern, or an electro-photographic printer that forms an image by transferring and fixing color toner onto a printing medium. As shown in FIG. 5, the printer 40 comprises: a print module 41 that contains a print head, a rotating drum, or the like and executes print processing onto a printing medium; a slot 42 that receives a storage device MC; and a control module 43 that analyzes image processing control information CI that was read from the storage device MC and controls operations of each part of the printer 40 based on the analyzed image processing control information CI. The control module 43 comprises: a processor (CPU) 430 that executes various processing; a read-only memory (ROM) 431 that stores programs or the like that are to be executed in the CPU 430; and a random access memory (RAM) 432 that temporally stores the result of processing in the CPU 430 and the obtained data.

C. Image File Generation Processing

Figure 6:
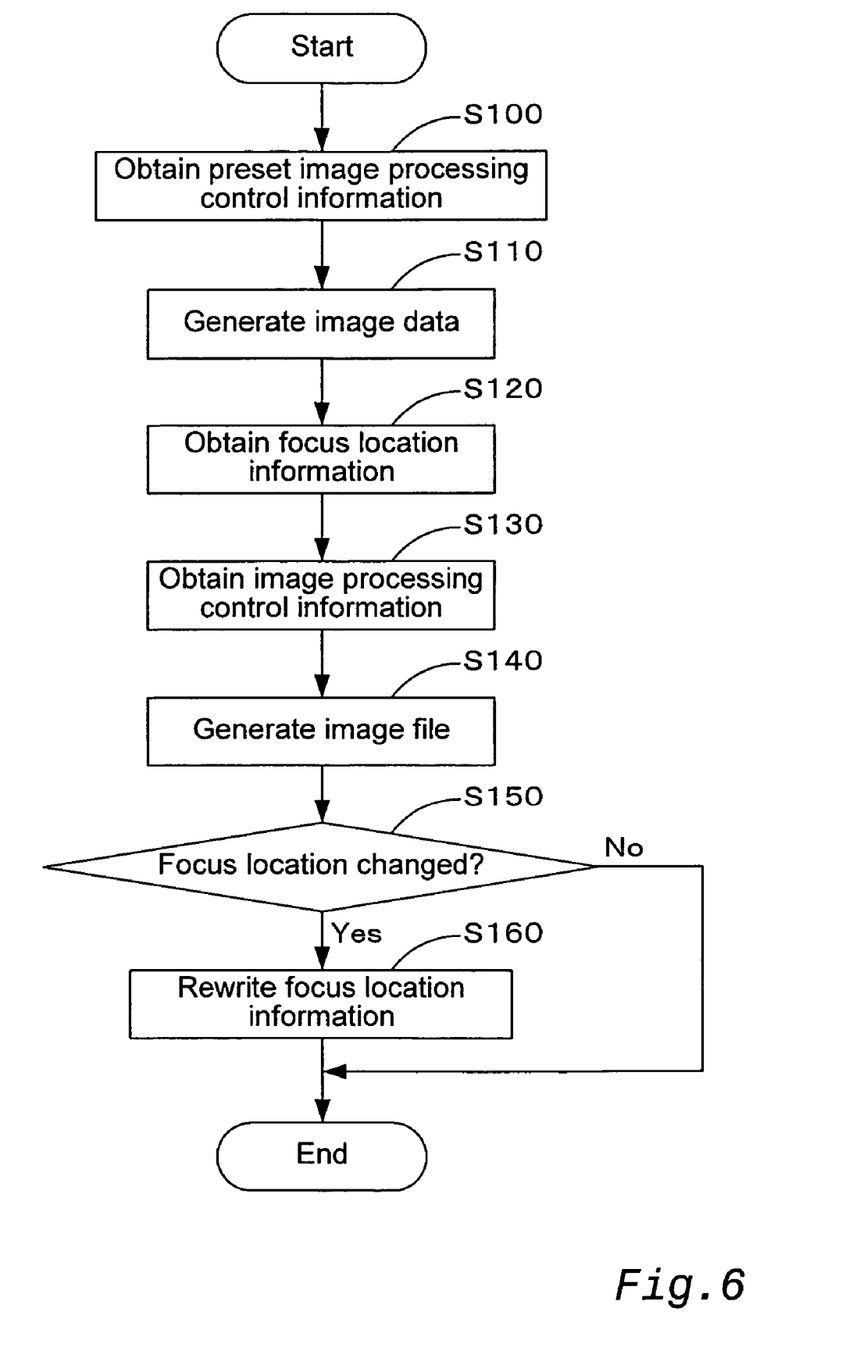
FIG. 6 is a flowchart that shows the processing routine of the image file generation processing that is executed in a digital still camera 20 of the present embodiment.

The image file generation processing that is executed in the digital still camera 20 of the present embodiment will now be described with reference to FIG. 6. FIG. 6 is a flowchart that shows the processing routine of the image file generation processing that is executed in the digital still camera 20 of the present embodiment.

The control circuit 24 of the digital still camera 20 starts the processing routine when an image generation request is generated from a push-down of a shutter button or the like. The control circuit 24 obtains preset image processing control information, i.e. setting information of a shot scene that was set by a photographer, in step S100. The setting of a shot scene is performed by manipulating a dial button (not shown) or a select and decide button 25 to freely select a scene on a monitor display (not shown), before the shutter button is pushed down. The shot scene may be in modes such as: a normal mode that indicates a normal shot scene; a portrait mode that is appropriate for shots that include primarily person(s); and a macro mode that is effective for close-up shooting.

The control circuit 24 generates image data based on voltage information that was obtained from a CCD, in step S110. The control circuit 24 then obtains the focus location information at the time of the push-down of the shutter button, in step S120. The focus location information indicates the location to which the focus is on within a shooting frame at the time of shooting, and in the case where the frame is divided by 256 in both a vertical direction (Y direction) and a horizontal direction (X direction), for example, the focus location information is represented by a piece of coordinate location information (X, Y) that has an origin at its upper left location. The control circuit 24 obtains image processing control information other than the preset image processing control information, e.g. color space information that is used at the time of image processing, in step S130, and stores the obtained information, i.e. the preset image processing control information, the focus location information, and the image processing control information, as well as the generated image data into a memory card as an image file, in step S140. At this time, the preset image processing control information, the focus location information, and the image processing control information are recorded in a control information storage region 113 of an Exif file, whereas the image data is recorded in a JPEG image data storage region 111 of the file in JPEG data format.

The control circuit 24 then determines whether or not the focus location was changed in step S150. In the digital still camera 20 of the present embodiment, the focus location can be changed on a monitor display by displaying image data, which is included in an image file GF stored in a memory card MC, on the monitor display and then by manipulating the select and decide button 25. It is therefore necessary to update the focus location information when the focus location is changed. When the focus location is determined to be changed in step S150 (YES returned), the control circuit 24 rewrites the focus location information that is stored in the control information storage region 113 of the image file GF stored in the memory card MC in step S160, and then ends the processing routine. On the other hand, when the focus location is determined to be unchanged in step S150 (NO returned), the control circuit 24 ends the processing routine.

D. Image Processing

Figure 7:
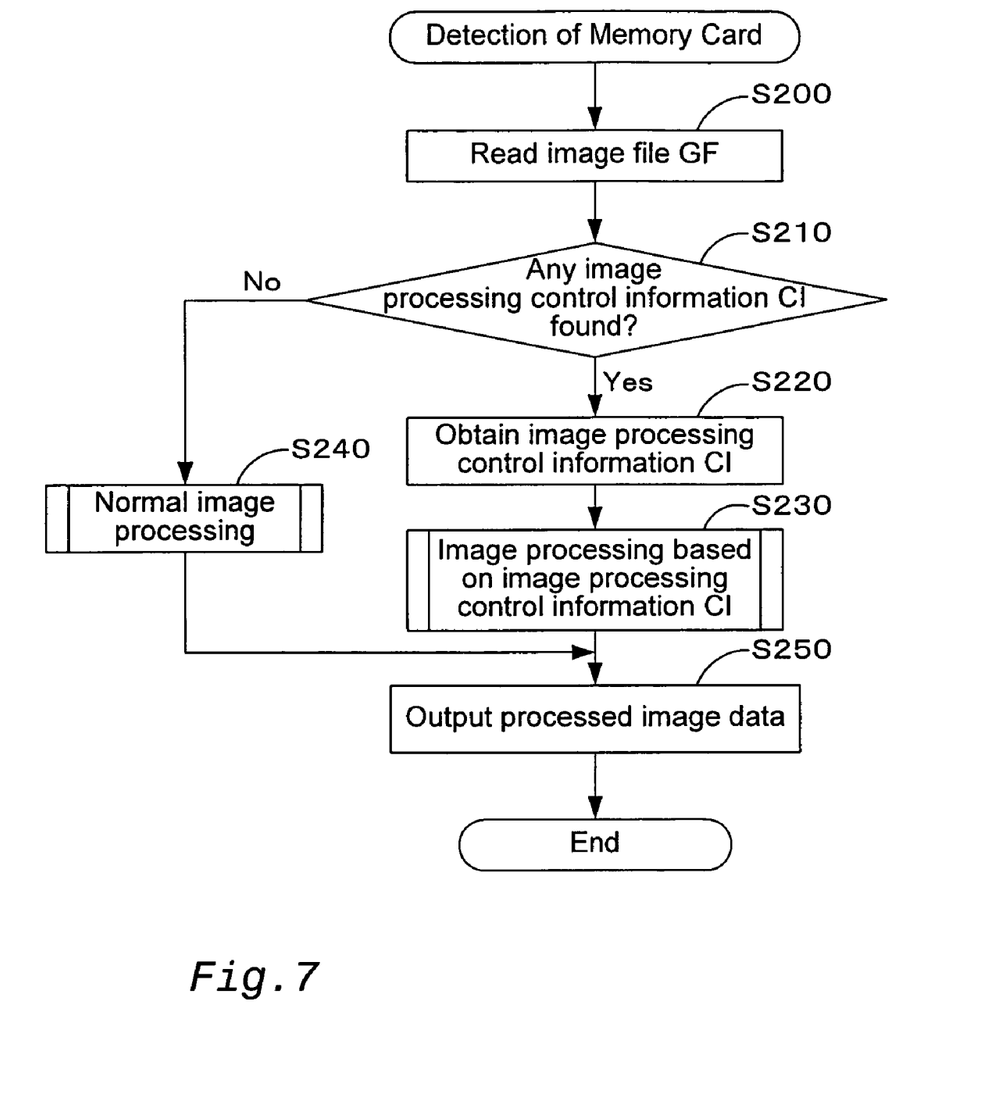
FIG. 7 is a flowchart that shows the processing routine of the image processing control that is executed by a personal computer 30 of the present embodiment.
Figure 8:
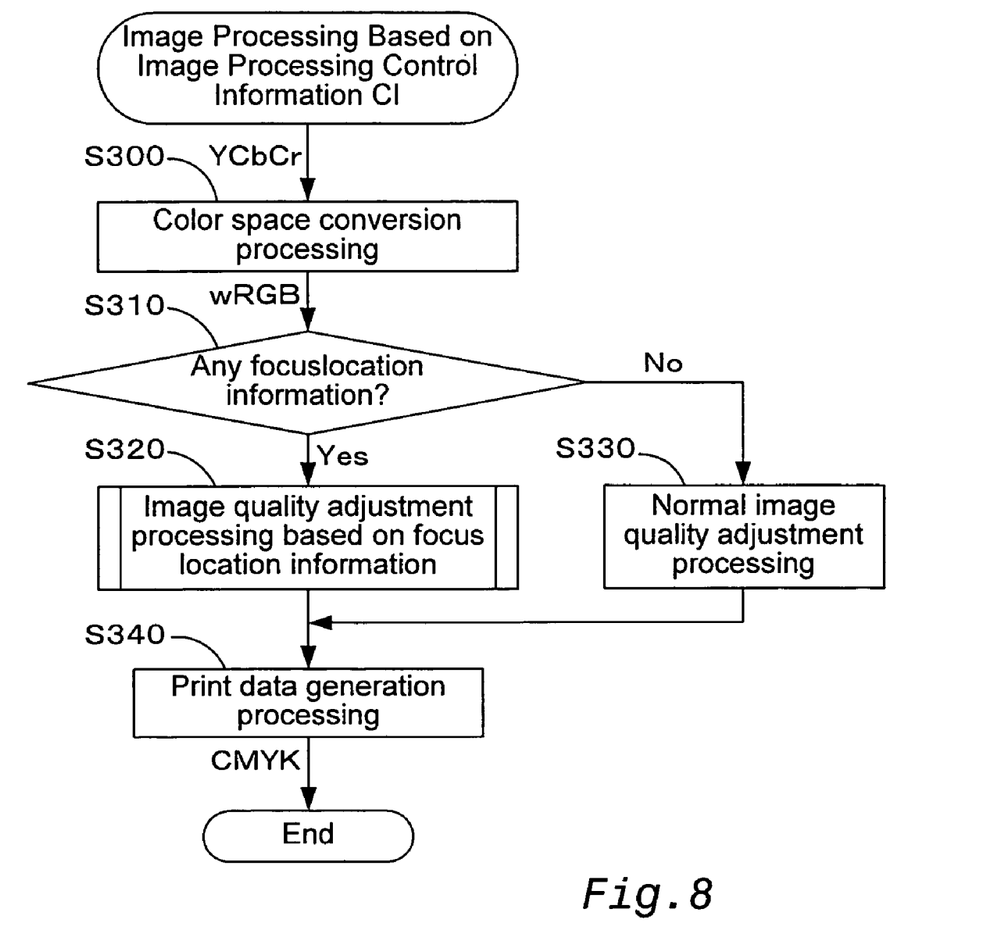
FIG. 8 is a flowchart that shows the processing routine that is executed at the time of the image processing based on the image processing control information in FIG. 7.
Figure 9:
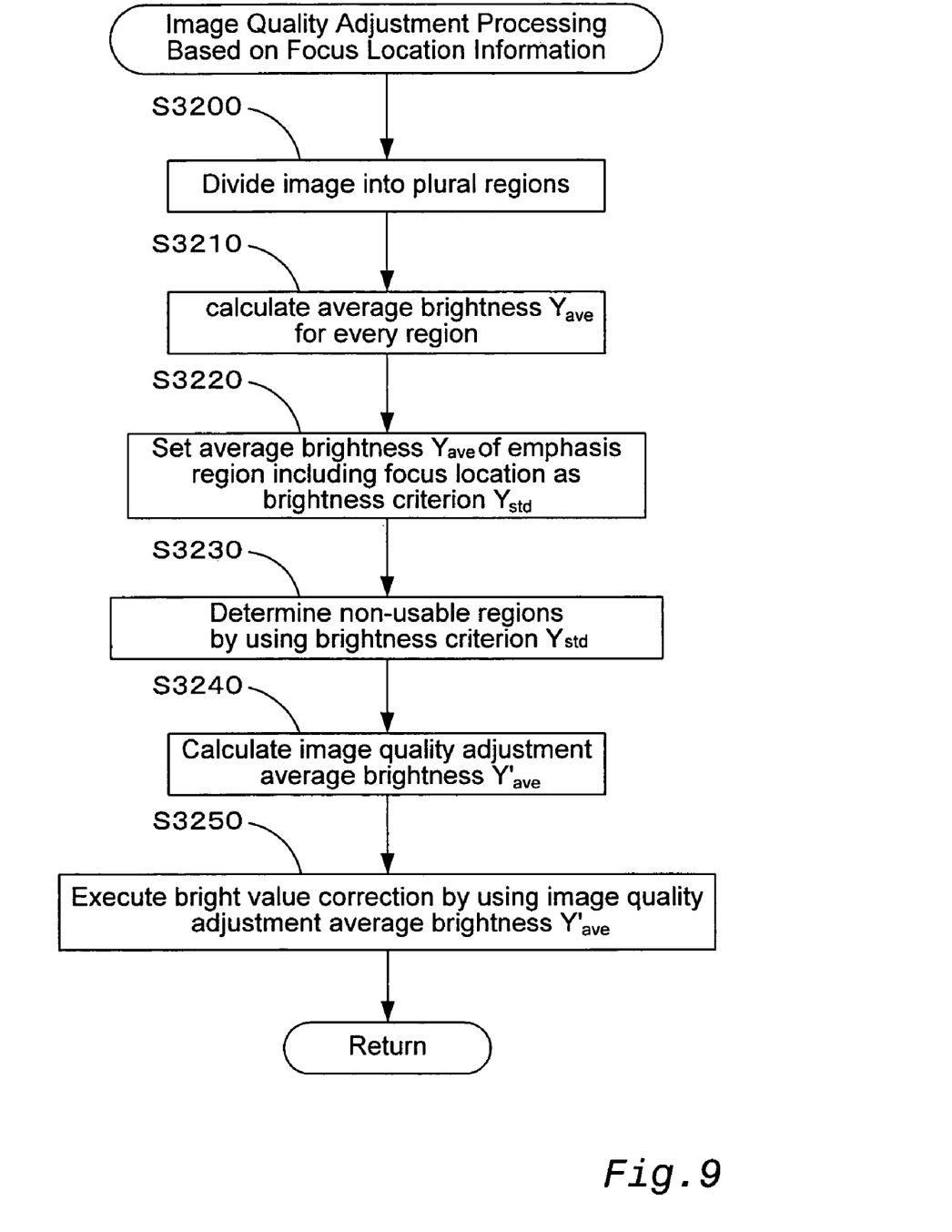
FIG. 9 is a flowchart that shows the processing routine that is executed at the time of the image adjustment processing based on the focus location information in FIG. 8.

The image processing that is executed in the personal computer 30 as an image processing device will now be described with reference to FIGS. 7 to 9. FIG. 7 is a flowchart that shows the processing routine of an image processing control that is executed by the personal computer 30 of the present embodiment. FIG. 8 is a flowchart that shows the processing routine that is executed at the time of the image processing based on the image processing control information in FIG. 7. FIG. 9 is a flowchart that shows the processing routine that is executed at the time of the image adjustment processing based on the focus location information in FIG. 8.

The processing routine shown in FIG. 7 is executed when the CPU 300 detects the attachment of a memory card MC in the card slot 33, for example. The CPU 300 reads an image file GF, which was specified via the input device 32, from the memory card MC in step S200. The CPU 300 retrieves image processing control information CI from the control information storage region 113 of the image file GF in step S210, and if any image processing control information CI was found in step S210 (YES returned), the CPU 300 obtains the image processing control information CI including focus location information in step S220. The CPU 300 then executes image processing based on the obtained image processing control information CI in step S230.

On the other hand, if no image processing control information CI was found in the control information storage region 113 of the image file GF in step S210 (NO returned), the CPU 300 executes image processing in a normal way in step S240. The normal image processing does not use any image processing control information CI including the focus location information, but is executed based on application facilities that are stored in the HDD 302 of the personal computer 30.

When image processing is complete in step S230 or in step S240, the CPU 300 outputs the processed image data to the color printer 40 or to the display device 31 in step S250, and ends the processing routine.

The image processing based on the image processing control information will now be described with reference to FIG. 8. Alphabetical terms in the flowchart indicate color spaces under which image data is represented. The CPU 300 in step S300 uses color conversion matrix values and gamma correction values for specified color spaces from among the image processing control information CI to execute color space conversion processing that converts the color space of the image data GD from a YCbCr color space to a wRGB color space. In the color space conversion processing, the CPU 300 first uses a matrix S for converting YCbCr image data into RGB image data, to convert the color space of the image data represented in JPEG format into, e.g. sRGB image data. The CPU 300 then combines a matrix M that is comprised of specified color conversion matrix values with a conversion matrix ($N^{-1}$) that is stored in the HDD 302 to generate a matrix $N^{-1}M$. The CPU 300 uses specified gamma correction values to execute a gamma correction to each of the color components R, G, and B, and then uses the obtained matrix $N^{-1}M$ to convert the color space of the image data from sRGB into WRGB. The CPU 300 then uses gamma correction values that are stored in the HDD 302 to execute an inverted gamma correction to the obtained wRGB image data.

The CPU 300 determines whether or not any focus location information is included in the image processing control information CI in step S310. If any focus location information is determined to be included in step S310 (YES returned), the CPU 300 executes an image adjustment processing based on the focus location information in step S320. If no focus location information is determined to be included in step S310 (NO returned), the CPU 300 executes an image adjustment processing in a normal way in step S330. The image adjustment processing is executed by: analyzing characteristics of the image data to generate histograms; calculating statistics based on the generated histograms; adjusting tone curves so as to reduce or eliminate the deviations between the statistics and the reference values of the image processing; and using the adjusted tone curves to adjust the relationships between the input values and the output values of the image data. Image quality parameters to be adjusted in the image adjustment processing include: brightness value, contrast, color balance, sharpness, shadow point, highlight point, and so forth, and the reference value of each parameter is changed by a respective control parameter value that is included in the image processing control information CI. As described previously, the image processing control information CI may be a piece of information that is comprised of plural parameter groups each corresponding to a shooting mode at the time of shooting. With this structure, it is possible to achieve the image adjustment processing in a way suitable for the shooting mode.

The CPU 300 executes print data generating processing by using the image processed image data in step S340, and ends the processing routine. In the print data generation processing, the CPU 300 uses a three-dimensional lookup table to convert the color space of the image data from wRGB to CMYK, executes halftone processing and raster processing, and transfers the print data to the control circuit 43 of the color printer 40.

The image adjustment processing based on the focus location information will now be described with reference to FIG. 9. For ease of explanation, the adjustment of the brightness value of an image will be described as a representative example. The CPU 300 divides an image into plural regions, e.g. by 256 in each of a vertical and a horizontal direction, respectively, in step S3200. For each region of the image, coordinate location information (X', Y') with an origin at its upper-left location is assigned in the range of (0-255, 0-255). The CPU 300 then generates a histogram and calculates an average brightness Y ave (a region image characteristic value) for each of the regions in step S3210. The CPU 300 then determines a focus location on the image by using focus location information, sets a region at the determined location as an emphasis region, and sets the average brightness Y ave of the emphasis region as a brightness criterion Y std in step S3220. Since the focus location information in the present embodiment is represented as a piece of coordinate location information (X, Y) with an origin at its upper left location as described previously, a region where the coordinate location information (X', Y') assigned to the image coincides with the coordinate location information (X, Y) in the focus location information is set to be the emphasis region. For example, in the case where (X, Y)=(125, 200), a region on the image where (X', Y')=(125, 200) is set to be the emphasis region.

The CPU 300 uses the brightness criterion Y std set above to determine non-usable regions to be excluded from consideration in the subsequent image adjustment, in step S3230. In other words, the brightness criterion Y std is a criterion that is used to determine regions to be excluded from (or regions to be taken into) consideration in the process of calculating an image quality adjustment average brightness Y' ave (image characteristic value) of the entire image, which will be used in an image adjustment. More particularly, in the case where an absolute value of the difference between the brightness criterion Y std and the average brightness Y ave of each region is more than a threshold value, the region is considered as unnecessary information or noise information, and thus is determined to be an unnecessary region. In this way, by calculating a sampling value of the image on the basis of the emphasis region at the time of image quality adjustment, it is possible to achieve an image adjustment with high accuracy and with a focus on the emphasis region. It should be noted that in the present embodiment, the emphasis region is a region that is determined based on the location where the generator of the image data (the photographer) focuses on, and represents a region on the image (a focus region) that is to become the basis of the image analysis in image processing.

The decision theory of non-usable regions will now be described in detail. Suppose that the coordinate of the emphasis region (the focus location coordinate) is (Xf, Yf) and the center coordinate of each region is (Xa, Ya), the distance FD between the center coordinate of each region and the emphasis region coordinate can be obtained from:

$$FD = \text{sqrt}[(Xa-Xf)^2 + (Ya-Yf)^2] \qquad \text{equation 1.}$$

Figure 10:
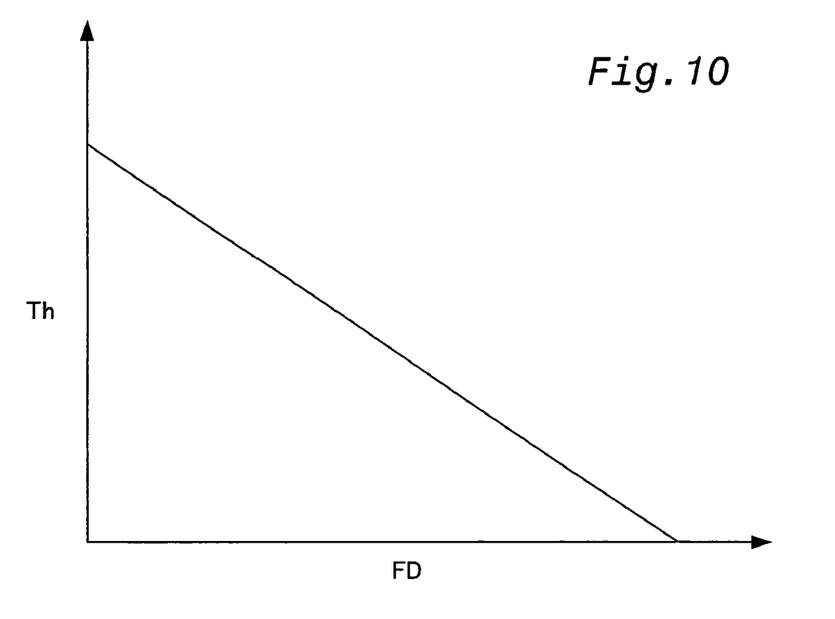
FIG. 10 is a schematic that shows the relationship between distances from an emphasis region coordinate to the center coordinate of each region and threshold values that are used for the determination of usable or non-usable of each region.

The distance from the emphasis region coordinate (the focus location coordinate) to the center coordinate of each region, and a threshold value that is used for the determination of the usable and the non-usable portions of each region, are associated with one another by a characteristic line shown in FIG. 10, for example. Accordingly, the non-usable regions can be determined by using the result of equation 1 and the characteristic line shown in FIG. 10.

It should be noted that image regions are divided into two groups: an emphasis region and its adjacent regions; and the outer regions of the adjacent regions, for the simplification of processing. Thus, two threshold values: a threshold value Th1 for the emphasis region and its adjacent regions; and a threshold value Th2 for the other regions, are used in the present embodiment. Since the adjacent regions are around the emphasis region and are likely to be a part of the major object, the threshold values are set to be Th1>Th2, so as to make it easier to maintain the adjacent regions and exclude the other regions as non-usable regions.

As for the adjacent regions, one can use:

$$|Y \text{std} - Y \text{ave}(i)| > Th1 \qquad \text{equation 2; and}$$

as for the other regions, one can use:

$$|Y \text{std} - Y \text{ave}(i)| > Th2 \qquad \text{equation 3,}$$

to determine each region for which an average brightness Y ave(i) makes the absolute value on the left side to become greater than Th1 or Th2, to be a non-usable region.

The CPU 300 first calculates an image quality adjustment average brightness Y' ave, i.e. the average brightness of the entire image, by using the regions not excluded as non-usable regions and by reflecting a weighting W in accordance with the locations of the regions in step S3240, then executes a brightness value correction by using the calculated image quality adjustment average brightness Y' ave in step S3250, and thereafter returns to the processing routine shown in FIG. 8. In the brightness value correction, the CPU 300 adjusts a reference value Y ref, which is used in an image quality adjustment, by using value parameters from among image quality adjustment parameters included in the image processing control information CI and image quality adjustment parameters responsive to shooting modes, and then adjusts the characteristics of tone curves, which represent the relationships between the input values and the output values of the image data, by using the adjusted reference value Y' ref and the image quality adjustment brightness average Y' ave. The CPU 300 then adjusts the values of the image data pixel-by-pixel by using the tone curves whose characteristics are adjusted.

Figure 11:
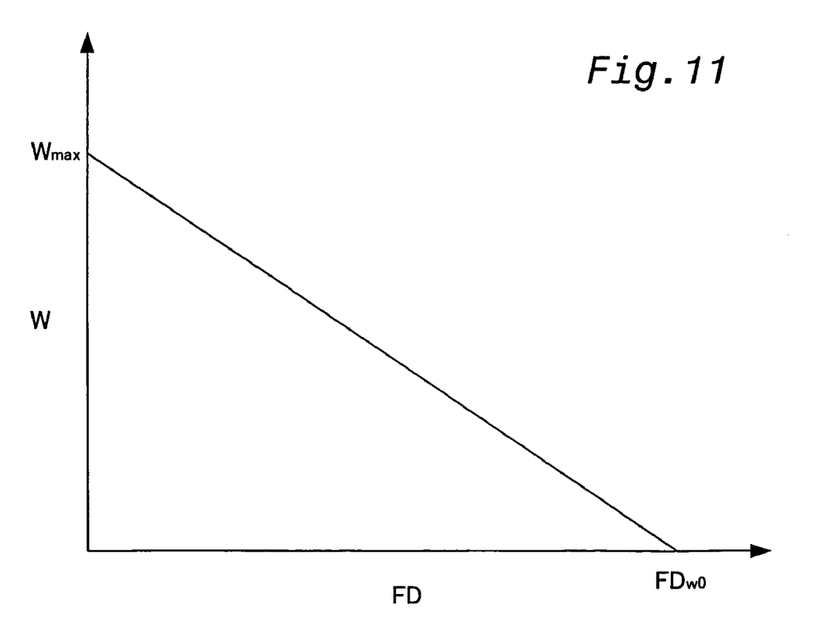
FIG. 11 is a schematic that shows the relationship between distances from an emphasis region coordinate to the center coordinate of each region and corresponding weightings W.

The decision theory of a weighting W will now be described in detail. Suppose the maximum weighting is W max and the distance between a center coordinate of each weighting 0 region and a coordinate of an emphasis region is FD w0, the distance FD and the weighting W are related by a characteristic line shown in FIG. 11, for example. In other words, the weighting W for each region can be obtained from:

$$W = W\max - FD*(W\max/FD\,w0) \qquad \text{equation 4.}$$

It should be noted, however, that in the present embodiment, image regions are classified into three types of regions: an emphasis region, adjacent regions, and the other regions, and W=3, W=2, and W=1 are assigned to the emphasis region, the adjacent regions, and the other regions, respectively. By using the thus obtained weighting W and the average brightness Y ave in each region, the total weighting of the average brightness ΣY ave can be calculated from:

$$\Sigma Y\text{ave} = Y\text{ave}1*3 + \Sigma Y\text{ave}2(i)*2 + \Sigma Y\text{ave}3(i) \qquad \text{equation 5,}$$

where Y ave1 represents the average brightness of an emphasis region; Y ave2 (i) represents the average brightness of an adjacent region; and Y ave3 (i) represents the average brightness of one of the other regions.

Suppose A num represents the number of regions where the weighting is effective, the image quality adjustment average brightness Y' ave, i.e. the average brightness of the entire image, can be obtained from:

$$Y\text{ave} = (\Sigma Y\text{ave})/(A\text{ num}) \qquad \text{equation 6,}$$

where A num=[the number of emphasis region]*3+[the number of adjacent regions]*2+[the number of the other regions]*1.

The process of a brightness value correction (an adjustment of tone curve characteristics) that uses the thus obtained image quality adjustment average brightness Y' ave and the adjustment reference value Y' ref (an image processing reference value) will now be described in detail. First of all, a brightness value correction amount Y apf is calculated from:

$$Y\text{apf} = \text{Int}(\text{sqrt}\{Y\text{ref} - Y\text{ave})*4\}) \qquad \text{equation 7.}$$

The tone curve characteristics are adjusted by: increasing the output level that corresponds to the ¼ point of the input level of the tone curve by the obtained brightness value correction amount Y apf in order to make the image brighter; or by decreasing the output level that corresponds to the ¾ point of the input level of the tone curve by the obtained brightness level correction amount Y apf in order to make the image darker.

As described above, with an image processing device of the present embodiment, it is possible to determine an emphasis region, which is to become the basis of an image analysis, by using focus location information that is included in an image file GF, so that it is possible to determine with accuracy the regions (or the points) on an image that are considered to be important for a photographer. It is also possible to achieve the image processing in a suitable way with the intention of the photographer reflected there to, based on the result of analysis. In other words, the photographer typically focuses on an object to which he (or she) is most interested in, so that an image quality adjustment on the basis of an emphasis region can be executed with accuracy by executing the image quality adjustment with a weight assigned on the object that exists on a location to which a focus is on.

E. Other Embodiments

Although an image quality adjustment using focus location information is described with respect to a brightness value adjustment in the above embodiments, it is also possible to use the focus location information for other types of adjustments such as, for example, a sharpness adjustment. In such a case, it is possible to strengthen the sharpness of an image at a focus location or in an emphasis region, or weaken the sharpness of an image in the other regions by using a Gaussian distribution method, so as to blur away the backgrounds of the image in a suitable way. The processing is particularly effective when a portrait mode is selected as the photo mode. For this reason, it is also possible to execute a sharpness adjustment at the time of an image quality adjustment without requiring any ad hoc selection processing, in the case where a portrait mode is selected as the photo mode. The information regarding whether or not a portrait mode was selected can be obtained by analyzing the image processing control information CI.

Additionally, although the above embodiments have been described with respect to using a personal computer 30 as an image processing device, it is also possible to use a color printer 40 as an image processing device as well. In the case where the color printer 40 does not require the personal computer 30, i.e. the color printer 40 being a so-called stand-alone printer, the color printer 40 executes image processing and print processing all by itself. For this reason, it is also possible to execute each of the above described processing routines with a control circuit 43 in the color printer 40.

Although a tone curve is used at the time of executing a brightness value correction in the above embodiment, it is also possible to create a look-up table as follows. That is to say, a brightness value correction value y is obtained from:

$$y = sqrt\ (Yref/Y\ ave) \qquad \text{equation 8,}$$

and a corrected brightness value Y" is obtained from:

$$Y'' = 255*(Y/255)^Y \qquad \text{equation 9,}$$

so that a look-up table is created for the corrected brightness values Y" each corresponding to a brightness value Y in an original image, and then a brightness correction is executed based on the created look-up table for every pixel in the image. It is obvious that the level of a reference value Y ref can be modified as appropriate based on the image processing control information CI.

Although an image processing device and an image file generating device of the present invention have been described with respect to the present embodiments, it should be noted that the embodiments are for making the present invention easy to understand, and in no way limit the present invention. It is obvious that the present invention can be varied or improved without departing from the scope of the appended claims and equivalents thereof.

Although the correction of brightness value or sharpness with the use of focus location information has been described in the above embodiments, it is also possible to use the focus location information to correct or adjust other image quality characteristics such as color balance, shadow point, highlight point, and so forth. In such cases, it is also possible to use the focus location information to locate an emphasis region of an image and execute an image quality adjustment of the image with a focus on the emphasis region.

The parameters specified by the image processing control information CI are for illustrative purposes only, and it is obvious that other appropriate parameters may also be used as well.

Although a digital still camera 20 was used as the shooting device in the above embodiments, other devices may also be used as well, such as a scanner or a digital video camera. In other words, an image file GF of the present embodiment may also be generated by input devices (image file generating devices) other than the digital still camera (DSC), such as a digital video camera (DVD) or a scanner. In the case where a digital video camera is used for the generation of an image file, either an image file that stores static image data and output control information, or a dynamic image file that contains dynamic image data in, e.g. MPEG format, and output control information is generated. In the case where the dynamic image file is used, an output control is executed for all or a part of the frame of the dynamic image according to the output control information.

Although an image is divided into 256*256 regions in the above embodiments, it is also possible to divide an image into smaller or larger regions. Dividing an image into at least two regions can generate an emphasis region and at least one other region. Dividing an image into smaller regions can improve the accuracy of the image adjustment, whereas dividing an image into larger regions can shorten the processing time for the image adjustment. Accordingly, the number of regions into which an image is divided may be determined according to the level of image quality that is to be required as the result of the image adjustment.

Although an Exif format file is used as a specific example of an image file GF in the above embodiments, the image file that is used in a shooting device of the present invention is not restricted to this format. In other words, any suitable image file that can contain the image data that is to be output by an output device and the image processing control information CI that specifies image processing conditions of the image data in an image processing device can be used. This is because as long as such a file is used, it is possible to generate an image file that contains image data and image processing control information CI in the shooting device.

It should be noted that an image file GF that contains image data and output device control device CI further contains a file that: generates association data that associates the image data and the image processing control information CI; stores the image data and the image processing control information CI in separate files, respectively; and associates the image data and the image processing control information CI by referring to the association data at the time of image processing. This is because in such a case, although the image data and the image processing control information CI are stored in separate files, the image data and the image processing control information CI are in a unified, inseparable relationship at the point of image processing that uses the image processing control information CI, so that the image data and the image processing control information CI function as substantially the same as if they are stored in one file. In other words, at least at the point of image processing, the embodiment where image data and image processing control information CI are used in a state of being associated one another, is included in the image file GF of the present embodiment. Furthermore, dynamic image files that are stored in optical disk media such as CD-ROM, CD-R, DVD-ROM, and DVD-RAM are also included in the image file GF of the present embodiment.

What is claimed is:

1. A method executing image processing of image data with object information, said object information is associated with said image data and indicates a location of a major object on an image that is based on said image data, said method comprising:

determining an emphasis region by using said object information, said emphasis region is to become the basis of an image analysis;

analyzing said image data on the basis of said emphasis region;

executing image processing of said image data based on the result of analysis; and dividing an image that is based on said image data into plural regions, wherein said emphasis region is determined from among said plural regions, and the plural regions other than said emphasis region are general regions, wherein said determining the emphasis region includes:

obtaining region image characteristic values for each of said emphasis region and the plural regions other than said emphasis region based on said result of analysis; and generating an image characteristic value for the entire image by increasingly weighting the region image characteristic values in said plural regions as the regions become closer to said emphasis region, wherein the image processing of said image data is executed by using said generated image characteristic value.

2. A method according to claim 1, wherein said generating the image characteristic value includes:

classifying the general regions into usable regions and non-usable regions by using the region image characteristic value of said emphasis region, wherein said image characteristic value is generated by using the region image characteristic value of said emphasis region and the region image characteristic values of said usable regions.

3. A method according to claim 2, wherein said region classification is executed based on the absolute differences between the region image characteristic value of said emphasis region and the region image characteristic values of said general regions.

4. A method according to claim 3, wherein said region classification based on the absolute differences between the region image characteristic value of said emphasis region and the region image characteristic values of said general regions is executed by classifying a general region as a usable region in a case where the absolute difference between the region image characteristic value of said emphasis region and the region image characteristic value of said general region is less than a predetermined value, and as a non-usable region in a case where the absolute difference is equal to or more than the predetermined value.

5. A method according to claim 4, wherein said predetermined value varies according to the distances between said emphasis region and each of said general regions.

6. A method according to claim 2, wherein said object information is a piece of information that indicates a location to where a focus is on, on an image that is based on said image data.

7. A method according to one of claims 1 to 5, wherein said image processing is a type of processing that reduces the absolute difference between said generated image characteristic value and a predefined image processing reference value.

8. A method according to claim 7, wherein said image data is further associated with image processing control information that contains image processing conditions in the image processing device and scene specifying information for reflecting a shot scene onto image processing, and wherein said image processing is executed with said scene specifying information reflected thereto and in a way to reduce the absolute difference between said generated image characteristic value and said image processing reference value.

* * * * *